US012746515B2

(12) United States Patent
Kim et al.

(10) Patent No.: US 12,746,515 B2
(45) Date of Patent: Sep. 29, 2026

(54) CARTRIDGE OF FUEL CELL HUMIDIFIER, AND FUEL CELL HUMIDIFIER

(71) Applicant: KOLON INDUSTRIES, INC., Seoul (KR)

(72) Inventors: Do Woo Kim, Seoul (KR); Hyoung Mo Yang, Seoul (KR); Woong Jeon Ahn, Seoul (KR); Jung Kun Her, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 716 days.

(21) Appl. No.: 18/253,418

(22) PCT Filed: Nov. 11, 2021

(86) PCT No.: PCT/KR2021/016393

§ 371 (c)(1),
(2) Date: May 18, 2023

(87) PCT Pub. No.: WO2022/145702

PCT Pub. Date: Jul. 7, 2022

(65) Prior Publication Data

US 2024/0021848 A1 Jan. 18, 2024

(30) Foreign Application Priority Data

Dec. 30, 2020 (KR) ........................ 10-2020-0187672

(51) Int. Cl.
*B01D 63/02* (2006.01)
*H01M 8/04119* (2016.01)

(52) U.S. Cl.
CPC ...... *B01D 63/031* (2022.08); *B01D 2313/131* (2022.08); *B01D 2313/21* (2013.01); *B01D 2313/44* (2013.01); *H01M 8/04149* (2013.01)

(58) Field of Classification Search
CPC ............ B01D 63/031; B01D 2313/131; B01D 2313/21; B01D 2313/44; B01D 63/021;
(Continued)

(56) References Cited

U.S. PATENT DOCUMENTS 4,038,190 A 7/1977 Baudet
7,938,386 B2 5/2011 Koenig
2018/0316028 A1 * 11/2018 An .................... H01M 8/04805

FOREIGN PATENT DOCUMENTS

DE 3611621 A1 10/1986
EP 1152817 B1 1/2003
(Continued)

OTHER PUBLICATIONS

The search report dated Aug. 19, 2024, related to the corresponding European Patent application.
(Continued)

*Primary Examiner* — Christopher P Jones
*Assistant Examiner* — Miriam N Ezeluomba
(74) *Attorney, Agent, or Firm* — Harvest IP Law, LLP

(57) ABSTRACT

The present invention relates to a cartridge of a fuel cell humidifier, and a fuel cell humidifier, wherein the cartridge of a fuel cell humidifier for humidifying dry gas supplied from the outside by using wet gas discharged from a fuel cell stack comprises: an inner case having an opening at an end and containing a plurality of hollow fiber membranes; and a first fixing layer and a second fixing layer for fixing the respective ends of the hollow fiber membranes. The inner case comprises: a first divided case and a second divided case for accommodating the hollow fiber membranes; and a first press-fitting member for coupling the first divided case and the second divided case in a press-fit manner.

10 Claims, 9 Drawing Sheets

(58) Field of Classification Search
CPC .............. B01D 63/022; B01D 2313/02; B01D 2313/041; H01M 8/04149; H01M 8/04141; H01M 8/04119; Y02E 60/50
USPC .............................................................. 261/1
See application file for complete search history.

(56) References Cited

FOREIGN PATENT DOCUMENTS

| | | | | | |
|---|---|---|---|---|---|
| EP | 2735358 | B1 | | 1/2018 | |
| JP | 6628352 | B2 | | 1/2020 | |
| KR | 20080004228 | A | | 1/2008 | |
| KR | 20160073524 | A | | 6/2016 | |
| KR | 20200056714 | A | * | 5/2020 | .......... H01M 2/1016 |
| KR | 10-2120933 | B1 | | 6/2020 | |
| KR | 20200122211 | A | | 10/2020 | |
| KR | 20200122260 | A | | 10/2020 | |
| WO | 2013137313 | A1 | | 9/2013 | |

OTHER PUBLICATIONS

The office action dated Aug. 23, 2024, related to the corresponding Canadian Patent application.
The office action dated Apr. 8, 2024 related to the corresponding Korean Patent application.

* cited by examiner

CARTRIDGE OF FUEL CELL HUMIDIFIER, AND FUEL CELL HUMIDIFIER

CROSS REFERENCE TO RELATED APPLICATION(S)

This application is a National Stage of International Application No. PCT/KR2021/016393filed Nov. 11, 2021, claiming priority based on Korean Patent Application No. 10-2020-0187672 filed Dec. 30, 2020, the disclosures of which are incorporated herein by reference in their entireties.

TECHNICAL FIELD

The present disclosure relates to a humidifier for fuel cells configured to supply humidified gas to a fuel cell.

BACKGROUND ART

A fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may generally be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, if the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane or the proton exchange membrane.

Among these methods, the membrane humidification method, which provides water vapor to air that is supplied to the polymer electrolyte membrane or the proton exchange membrane using a membrane configured to selectively transmit only water vapor included in off-gas in order to humidify the polymer electrolyte membrane or the proton exchange membrane, is advantageous in that it is possible to reduce the weight and size of a humidifier.

When a module is formed, a hollow fiber membrane having large transmission area per unit volume is suitable for a permselective membrane used in the membrane humidification method. That is, when a humidifier is manufactured using a hollow fiber membrane, high integration of the hollow fiber membrane having large contact surface area is possible, whereby it is possible to sufficiently humidify the fuel cell even at a small capacity, it is possible to use a low-priced material, and it is possible to collect moisture and heat included in off-gas discharged from the fuel cell at a high temperature and to reuse the collected moisture and heat through the humidifier.

FIG. 1 is a schematic exploded perspective view of a conventional humidifier for fuel cells.

As illustrated in FIG. 1, a conventional membrane humidification type humidifier 100 includes a humidifying module 110, in which moisture exchange is performed between air supplied from the outside and off-gas discharged from a fuel cell stack (not shown), and caps 120 coupled respectively to opposite ends of the humidifying module 110.

One of the caps 120 transmits air supplied from the outside to the humidifying module 110, and the other cap transmits air humidified by the humidifying module 110 to the fuel cell stack.

The humidifying module 110 includes a mid-case 111 having an off-gas inlet 111*a* and an off-gas outlet 111*b* and a plurality of hollow fiber membranes 112 in the mid-case 111. Opposite ends of the hollow fiber membranes 112 are potted in fixing layers 113. In general, each of the fixing layers 113 is formed by hardening a liquid polymer, such as liquid polyurethane resin, using a casting method. The fixing layers 113, in which ends of the hollow fiber membranes 112 are potted, and resin layers 114 provided between the fixing layers 113 and the mid-case 111 isolate inner spaces of the caps 120 from an inner space of the mid-case 111. Similarly to the fixing layers 113, each of the resin layers 114 is generally formed by hardening a liquid polymer, such as liquid polyurethane resin, using a casting method.

Air supplied from the outside flows along hollows of the hollow fiber membranes 112. Off-gas introduced into the mid-case 111 through the off-gas inlet 111*a* comes into contact with outer surfaces of the hollow fiber membranes 112, and is discharged from the mid-case 111 through the off-gas outlet 111*b*. When the off-gas comes into contact with the outer surfaces of the hollow fiber membranes 112, moisture contained in the off-gas is transmitted through the hollow fiber membranes 112 to humidify air flowing along the hollows of the hollow fiber membranes 112.

Conventionally, during a process of potting the opposite ends of the hollow fiber membranes 112 using a potting liquid, such as a liquid polymer, the potting liquid flows out, whereby the force of fixing the hollow fiber membranes 112 is weakened and quality of the humidifier for fuel cells is deteriorated.

DISCLOSURE

Technical Problem

The present disclosure has been made in view of the above problems, and it is an object of the present disclosure to provide a cartridge of a humidifier for fuel cells and a humidifier for fuel cells capable of reducing the outflow amount of a potting liquid during a process of potting hollow fiber membranes.

Technical Solution

In order to accomplish the above object, the present disclosure may include the following constructions.

A humidifier for fuel cells according to the present disclosure may include a humidifying module configured to humidify dry gas supplied from outside using wet gas discharged from a fuel cell stack, a first cap coupled to one end of the humidifying module, and a second cap coupled to the other end of the humidifying module. The humidifying module may include a mid-case open at opposite ends thereof and at least one cartridge disposed in the mid-case, the cartridge including a plurality of hollow fiber membranes. The cartridge may include an inner case having openings formed in ends thereof, the inner case being configured to receive the hollow fiber membranes, and a first fixing layer and a second fixing layer configured to fix opposite ends of the hollow fiber membranes. The inner case may include a first divided case and a second divided case configured to receive the hollow fiber membranes and a first press-fit member configured to couple the first divided case and the second divided case to each other by press-fit.

A cartridge of a humidifier for fuel cells according to the present disclosure is configured to humidify dry gas supplied from outside using wet gas discharged from a fuel cell stack. The cartridge may include an inner case having openings formed in ends thereof, the inner case being configured to receive a plurality of hollow fiber membranes, and a first fixing layer and a second fixing layer configured to fix opposite ends of the hollow fiber membranes. The inner case may include a first divided case and a second divided case configured to receive the hollow fiber membranes and a first press-fit member configured to couple the first divided case and the second divided case to each other by press-fit.

Advantageous Effects

The present disclosure may be implemented such that a first divided case and a second divided case are coupled to each other by press-fit using a first press-fit member. In the present disclosure, therefore, it is possible to securely couple the first divided case and the second divided case to each other using the first press-fit member, whereby it is possible to reduce the outflow amount of a potting liquid through the interface between the first divided case and the second divided case. In the present disclosure, therefore, it is possible to increase the force of fixing opposite ends of hollow fiber membranes using the first fixing layer and the second fixing layer and to improve quality of a cartridge therethrough.

In the present disclosure, the first divided case and the second divided case are coupled to each other by press-fit using the first press-fit member, whereby it is possible to reduce the inflow amount of a potting liquid introduced into an inner case from the outside of the inner case through the interface between the first divided case and the second divided case.

BEST MODE

Hereinafter, an embodiment of a humidifier for fuel cells according to the present disclosure will be described in detail with reference to the accompanying drawings. A cartridge of a humidifier for fuel cells according to the present disclosure may be included in a humidifier for fuel cells according to the present disclosure, and therefore the cartridge of the humidifier for fuel cells according to the present disclosure will also be described while the embodiment of the humidifier for fuel cells according to the present disclosure is described. Meanwhile, in FIGS. 8 to 10, two parallel curved lines are omission lines. A dotted line of FIG. 8 indicates a part of each of a first potting layer and a second potting layer located in an inner case.

Figure 1:
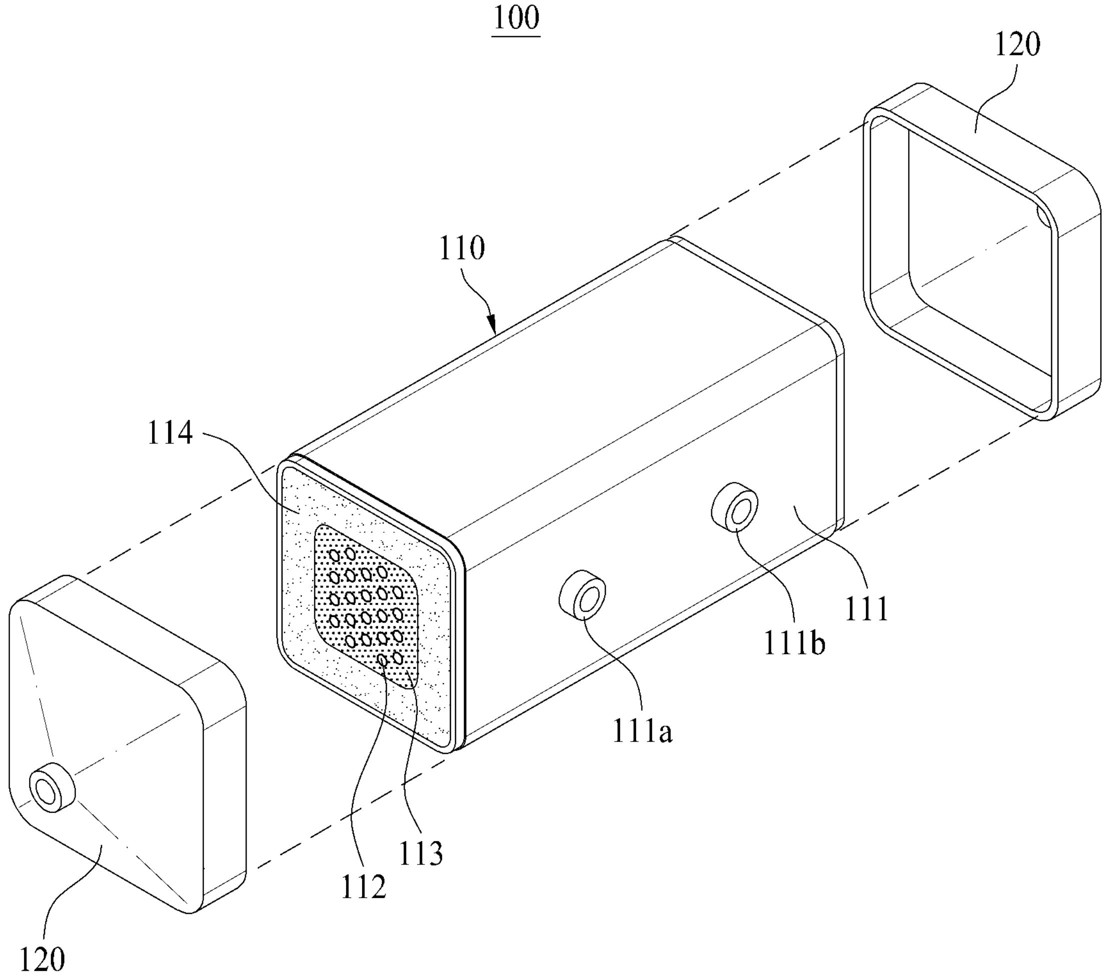
FIG. 1 is a schematic exploded perspective view of a conventional humidifier for fuel cells.
Figure 2:
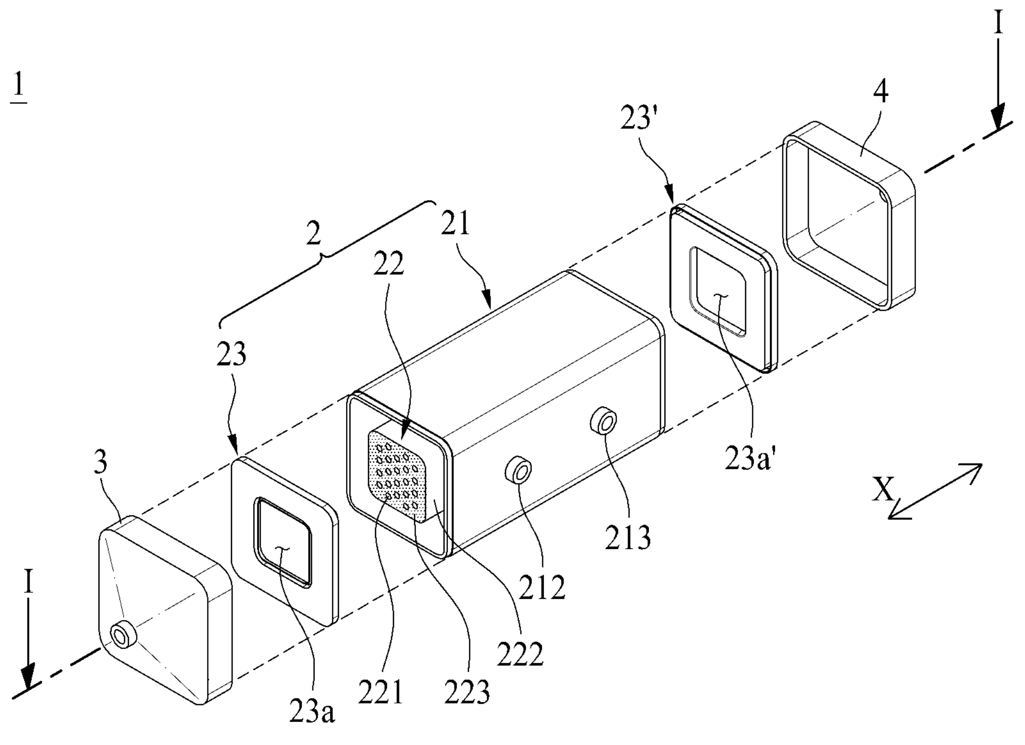
FIG. 2 is a schematic exploded perspective view of a humidifier for fuel cells according to the present disclosure.
Figure 3:
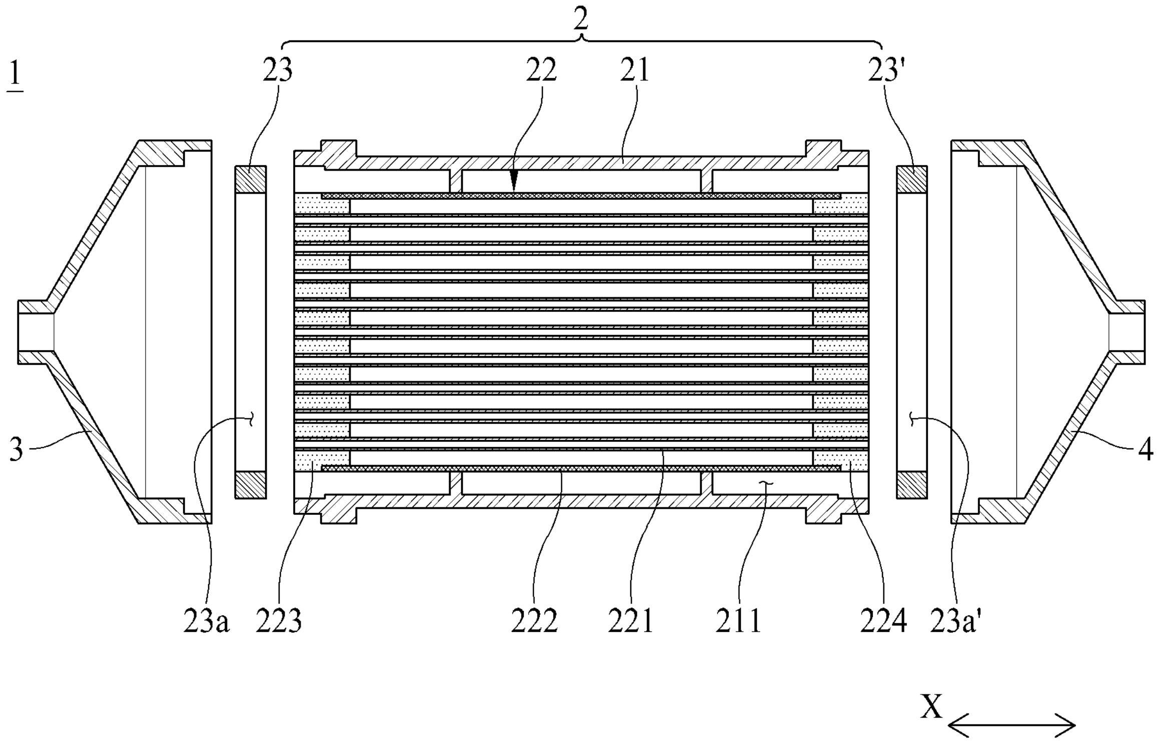
FIG. 3 is a schematic exploded sectional view showing the humidifier for fuel cells according to the present disclosure, taken along line I-I of FIG. 2.
Figure 4:
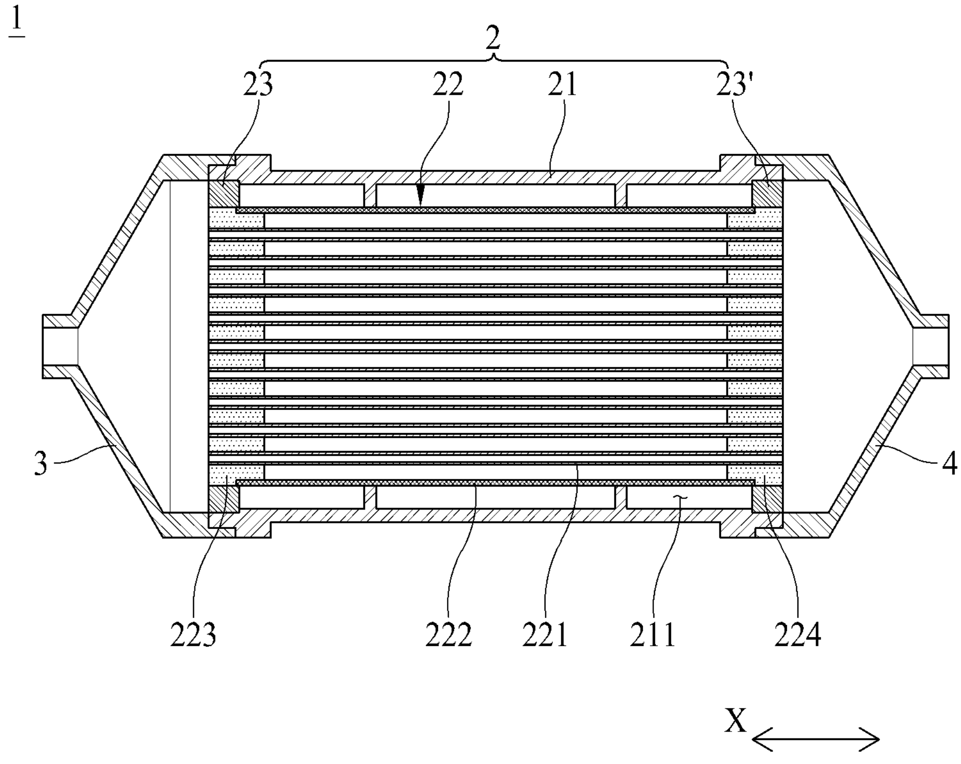
FIG. 4 is a schematic coupled sectional view showing the humidifier for fuel cells according to the present disclosure, taken along line I-I of FIG. 2.

Referring to FIGS. 2 to 4, a humidifier 1 for fuel cells according to the present disclosure is configured to humidify dry gas supplied from the outside using wet gas discharged from a fuel cell stack (not shown). The dry gas may be fuel gas or air. The dry gas may be humidified by the wet gas and may then be supplied to the fuel cell stack. The humidifier 1 for fuel cells according to the present disclosure includes a humidifying module 2 configured to humidify dry gas, a first cap 3 coupled to one end of the humidifying module 2, and a second cap 4 coupled to the other end of the humidifying module 2.

Referring to FIGS. 2 to 4, the humidifying module 2 humidifies dry gas supplied from the outside. The first cap 3 may be coupled to one end of the humidifying module 2. The second cap 4 may be coupled to the other end of the humidifying module 2. The first cap 3 may transmit dry gas to the humidifying module 2. In this case, the second cap 4 may transmit dry gas humidified by wet gas in the humidifying module 2 to the fuel cell stack. The first cap 3 may transmit wet gas to the humidifying module 2. In this case, the second cap 4 may discharge wet gas to the outside after dry gas is humidified in the humidifying module 2. The first cap 3 and the second cap 4 may be spaced apart from each other in a first axis direction (X-axis direction).

The humidifying module 2 includes a mid-case 21 and at least one cartridge 22.

The cartridge 22 is coupled to the mid-case 21. The cartridge 22 may be disposed in the mid-case 21. Opposite ends of the mid-case 21 are open. In this case, a receiving hole 211 may be formed in the mid-case 21. The receiving hole 211 may be formed so as to extend through the mid-case 21 in the first axis direction (X-axis direction).

An inlet 212 and an outlet 213 may be formed in the mid-case 21. The inlet 212 may allow wet gas or dry gas to be introduced into the mid-case 21 therethrough. The outlet 213 may allow wet gas or dry gas to be discharged from the mid-case 21 therethrough. The inlet 212 and the outlet 213 may be disposed spaced apart from each other in the first axis direction (X-axis direction).

When wet gas flows through the inlet 212 and the outlet 213, the wet gas may be supplied into the cartridge 22 via the interior of the mid-case 21 through the inlet 212, and may then come into contact with outer surfaces of hollow fiber membranes 221 of the cartridge 22. During this process, moisture contained in the wet gas may be transmitted through the hollow fiber membranes 221 to humidify dry gas flowing along hollows of the hollow fiber membranes 221. The humidified dry gas may be discharged from the hollow fiber membranes 221, and may then be supplied to the fuel cell stack through the second cap 4. After humidifying the dry gas, the wet gas may be discharged from the cartridge 22, may flow along the interior of the mid-case 21, and may be discharged from the mid-case 21 through the outlet 213. The inlet 212 may be connected to the fuel cell stack such that wet gas is supplied thereto. Wet gas may be off-gas discharged from the fuel cell stack.

When dry gas flows through the inlet 212 and the outlet 213, the dry gas may be supplied into the cartridge 22 via the interior of the mid-case 21 through the inlet 212, and may then come into contact with the outer surfaces of the hollow fiber membranes 221. During this process, moisture in wet gas flowing along the hollows of the hollow fiber membranes 221 may be transmitted through the hollow fiber membranes 221 to humidify dry gas introduced into the cartridge 22. The humidified dry gas may be discharged from the cartridge 22, may flow along the interior of the mid-case 21, may be discharged from the mid-case 21 through the outlet 213, and may be supplied to the fuel cell stack. After humidifying the dry gas, the wet gas may be discharged from the hollow fiber membranes 221, and may then be discharged to the outside through the second cap 4. The first cap 3 may be connected to the fuel cell stack such that wet gas is supplied thereto.

The cartridge 22 is disposed in the mid-case 21, and includes a plurality of hollow fiber membranes 221. The hollow fiber membranes 221 may be coupled to the cartridge 22 so as to be modularized. Consequently, the hollow fiber membranes 221 may be installed in the mid-case 21 through a process of coupling the cartridge 22 to the mid-case 21. In the humidifier 1 for fuel cells according to the present disclosure, therefore, ease in installation, separation, and replacement of the hollow fiber membranes 221 may be improved.

The cartridge 22 may include an inner case 222.

The inner case 222 has openings formed in ends thereof, and the plurality of hollow fiber membranes 221 is received in the inner case. The hollow fiber membranes 221 may be disposed in the inner case 222 so as to be modularized. The hollow fiber membranes 221 may include a polymer membrane made of polysulfone resin, polyethersulfone resin, sulfonated polysulfone resin, polyvinylidene fluoride (PVDF) resin, polyacrylonitrile (PAN) resin, polyimide resin, polyamide imide resin, polyester imide resin, or a mixture of two or more thereof.

The cartridge 22 may include a first fixing layer 223. The first fixing layer 223 is configured to fix one end of each of the hollow fiber membranes 221. The first fixing layer 223 may close a corresponding one of the openings of the inner case 222. In this case, the first fixing layer 223 may be formed so as not to block the hollows of the hollow fiber membranes 221. The first fixing layer 223 may be formed by hardening a potting liquid, such as liquid polyurethane resin, through a casting process. A part of the first fixing layer 223 may be located in the inner case 222, and the remaining part of the first fixing layer may be protrude from the inner case 222. The first fixing layer 223 may fix one end of each of the hollow fiber membranes 221 to the inner case 222.

The cartridge 22 may include a second fixing layer 224. The second fixing layer 224 is configured to fix the other end of each of the hollow fiber membranes 221. The second fixing layer 224 may close a corresponding one of the openings of the inner case 222. In this case, the second fixing layer 224 may be formed so as not to block the hollows of the hollow fiber membranes 221. The second fixing layer 224 may be formed by hardening a potting liquid, such as liquid polyurethane resin, through a casting process. A part of the second fixing layer 224 may be located in the inner case 222, and the remaining part of the second fixing layer may protrude from the inner case 222. The second fixing layer 224 may fix the other end of each of the hollow fiber membranes 221 to the inner case 222. Since the second fixing layer 224 and the first fixing layer 223 may be formed so as not to block the hollows of the hollow fiber membranes 221, dry gas or wet gas supplied from the outside may be supplied to the hollows of the hollow fiber membranes 221 without being disturbed by the second fixing layer 224 and the first fixing layer 223, and may be discharged from the hollows of the hollow fiber membranes 221 without being disturbed by the second fixing layer 224 and the first fixing layer 223. The second fixing layer 224 and the first fixing layer 223 may be disposed spaced apart from each other in the first axis direction (X-axis direction).

The humidifying module 2 may include a plurality of packing members 23 and 23'.

The packing members 23 and 23' form a hermetic seal between the cartridge 22 and the mid-case 21 in order to prevent direct mixing between dry gas and wet gas. The packing members 23 and 23' may be inserted between the cartridge 22 and the mid-case 21. In this case, the cartridge 22 may be inserted through through-holes **23*a* and 23*a*' formed respectively in the packing members 23 and 23'. The packing members 23 and 23' may be disposed respectively at opposite sides of the cartridge 22. Although not shown, resin layers may be formed respectively at the opposite sides of the cartridge 22 instead of the packing members 23 and 23'**. Each of the resin layers may be formed by hardening a liquid polymer, such as liquid polyurethane resin, using a casting method.

Referring to FIGS. 2 to 4, the first cap 3 is coupled to one end of the humidifying module 2. A space between the first cap 3 and the cartridge 22 may be isolated from a space between the cartridge 22 and the mid-case 21 in a hermetically sealed state by the packing member 23 or the resin layer.

Referring to FIGS. 2 to 4, the second cap 4 is coupled to the other end of the humidifying module 2. The second cap 4 may be coupled to the other end of the humidifying module 2 so as to be spaced apart from the first cap 3 in the first axis direction (X-axis direction). A space between the second cap 4 and the cartridge 22 may be isolated from the space between the cartridge 22 and the mid-case 21 in a hermetically sealed state by the packing member 23' or the resin layer.

Referring to FIGS. 2 to 7, in the humidifier 1 for fuel cells according to the present disclosure, the inner case 222 may be implemented through assembly of two or more divided cases. In the humidifier 1 for fuel cells according to the present disclosure, therefore, it is possible to individually manufacture the divided cases by injection molding, whereby it is possible to improve ease in manufacture, compared to when the inner case 222 is manufactured by performing injection molding once. Meanwhile, the divided cases may be assembled using a sliding method. In this case, a potting liquid may flow out through the interface between the divided cases during a process of forming the first fixing layer 223 and the second fixing layer 224. In order to prevent this, the inner case 222 may be implemented as follows.

The inner case 222 may include a first divided case 2221, a second divided case 2222, and a first press-fit member 2223.

The first divided case 2221 and the second divided case 2222 are configured to receive the hollow fiber membranes 221. Each of the first divided case 2221 and the second divided case 2222 may correspond to a divided case configured to implement the inner case 222 through assembly. Hereinafter, a description will be given based on an embodiment in which the inner case 222 is implemented through assembly between the first divided case 2221 and the second divided case 2222; however, it is obvious to those skilled in the art to which the present disclosure pertains that an embodiment in which the inner case 222 is implemented through assembly of three or more divided cases can be derived therefrom.

The first divided case 2221 may be disposed so as to cover an upper side of the hollow fiber membranes 221. In this case, the second divided case 2222 may be disposed so as to cover a lower side of the hollow fiber membranes 221. The first divided case 2221 and the second divided case 2222 may cover opposite side surfaces of the hollow fiber membranes 221, respectively. The opposite side surfaces of the hollow fiber membranes 221 are based on a second axis direction (Y-axis direction), which is perpendicular to the first axis direction (X-axis direction). In this case, the interface between the first divided case 2221 and the second divided case 2222 may be disposed at the opposite side surfaces of the hollow fiber membranes 221. Although not shown, the first divided case 2221 may be disposed so as to cover the lower side of the hollow fiber membranes 221, and the second divided case 2222 may be disposed so as to cover the upper side of the hollow fiber membranes 221.

The first press-fit member 2223 is configured to couple the first divided case 2221 and the second divided case 2222 to each other by press-fit. In the humidifier 1 for fuel cells according to the present disclosure, therefore, the first divided case 2221 and the second divided case 2222 may be coupled to each other using the first press-fit member 2223, whereby it is possible to reduce the outflow amount of the potting liquid through the interface between the first divided case 2221 and the second divided case 2222. In the humidifier 1 for fuel cells according to the present disclosure, therefore, it is possible to increase the force of fixing the opposite ends of the hollow fiber membranes 221 using the first fixing layer 223 and the second fixing layer 224 and to improve quality of the cartridge 22 therethrough. Also, in the humidifier 1 for fuel cells according to the present disclosure, it is possible to reduce the amount of the potting liquid that is introduced into the inner case 222 from the outside of the inner case 222 through the interface between the first divided case 2221 and the second divided case 2222 using the first press-fit member 2223. During a process in which the first divided case 2221 and the second divided case 2222 are coupled to each other through assembly, the first press-fit member 2223 may be interference-fit as the result of press-fit, whereby it is possible to prevent the interface between the first divided case 2221 and the second divided case 2222 from being opened, thereby preventing a gap from being generated therebetween. Based on the first axis direction (X-axis direction), the first press-fit member 2223 may be disposed such that the distance from the first fixing layer 223 is shorter than the distance from the second fixing layer 224. That is, the first press-fit member 2223 may be disposed closer to the first fixing layer 223.

The first press-fit member 2223 may include a first sliding groove 2223*a* (shown in FIG. 6) and a first insertion member 2223*b*.

The first sliding groove 2223*a* is formed in the first divided case 2221. The first divided case 2221 and the second divided case 2222 may be assembled by sliding through the first sliding groove 2223*a*. For example, in the state in which the first divided case 2221 and the second divided case 2222 are spaced apart from each other in the first axis direction (X-axis direction), at least one of the first divided case 2221 and the second divided case 2222 may be moved in a direction toward each other, whereby the first divided case and the second divided case may be assembly by sliding. The first sliding groove 2223*a* may be formed so as to extend in parallel to the first axis direction (X-axis direction).

The first insertion member 2223*b* is formed on the second divided case 2222. During a process in which the first divided case 2221 and the second divided case 2222 are assembled by sliding, the first insertion member 2223*b* may be inserted into the first sliding groove 2223*a*. At least a part of the first insertion member 2223*b* may be formed so as to have a larger size than the first sliding groove 2223*a*. As a result, the first insertion member 2223*b* may be press-fit while being inserted into the first sliding groove 2223*a*. In the humidifier 1 for fuel cells according to the present disclosure, therefore, it is possible to increase the force of coupling between the first divided case 2221 and the second divided case 2222 through press-fit of the first insertion member 2223*b*. In this case, at least a part of the first insertion member 2223*b* being formed so as to have a larger size than the first sliding groove 2223*a* may be based on the sectional area thereof taken in the second axis direction (Y-axis direction). The entirety of the first insertion member 2223*b* may be formed so as to have a larger size than the first sliding groove 2223*a*.

Figure 7:
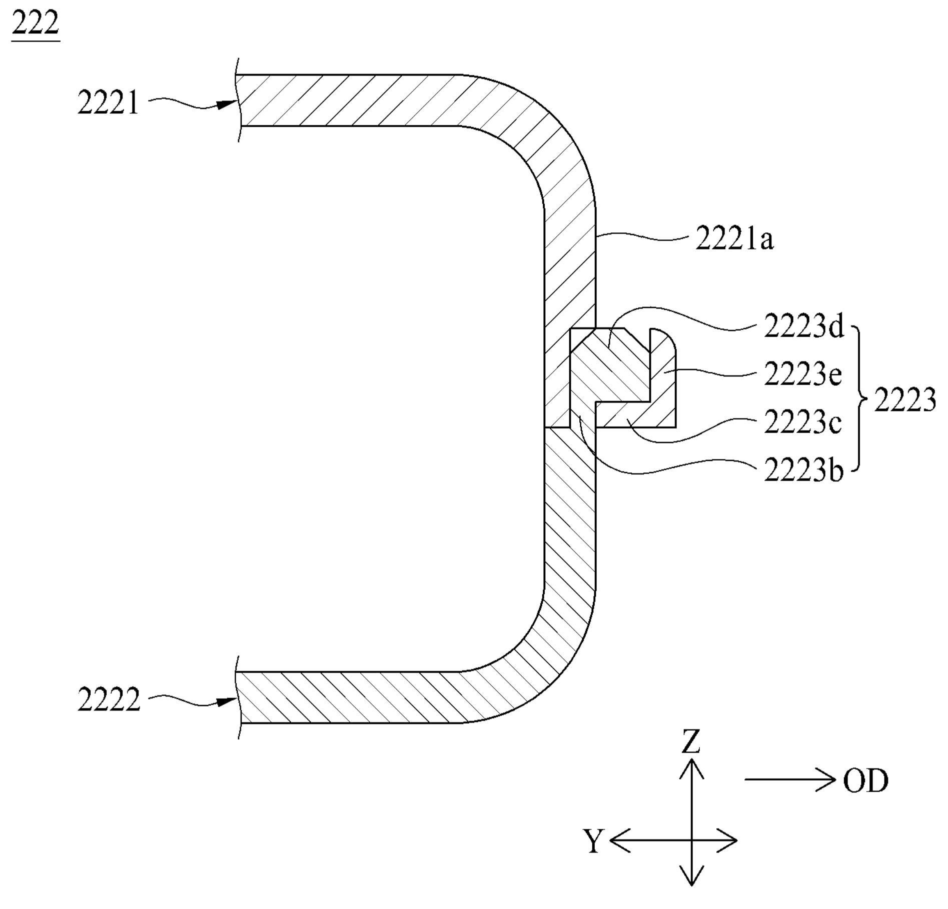
FIG. 7 is a schematic assembled sectional view showing the inner case in the cartridge of the humidifier for fuel cells according to the present disclosure, taken along line II-II of FIG. 5.

The first insertion member 2223*b* may protrude from the second divided case 2222. The first insertion member 2223*b* may protrude from the opposite surface of the second divided case 2222 that faces the first divided case 2221 toward the first divided case 2221. When the first divided case 2221 and the second divided case 2222 are coupled to each other by the first press-fit member 2223, as shown in FIG. 7, the first insertion member 2223*b* may be disposed so as to overlap the first divided case 2221. In the humidifier 1 for fuel cells according to the present disclosure, therefore, it is possible to further reduce the outflow amount and the inflow amount of the potting liquid using the structure in which the first insertion member 2223*b* and the first divided case 2221 overlap each other. The first insertion member 2223*b* and the second divided case 2222 may be integrally formed.

The first press-fit member 2223 may include a first protruding member 2223*c* and a first catching member 2223*d*.

The first protruding member 2223*c* is formed on the first divided case 2221. The first protruding member 2223*c* may protrude from an outer surface 2221*a* of the first divided case 2221 in an outward direction (direction indicated by arrow OD). The outer surface 2221*a* of the first divided case 2221 is a surface of the first divided case 2221 based on the second axis direction (Y-axis direction). The outward direction (direction indicated by arrow OD) may mean an outside direction of the first divided case 2221 based on an inner space thereof in which the hollow fiber membranes 221 are received. The outward direction (direction indicated by arrow OD) may be parallel to the second axis direction (Y-axis direction). The first protruding member 2223*c* and the first divided case 2221 may be integrally formed.

The first sliding groove 2223*a* may be formed in the first protruding member 2223*c*. A part of the first sliding groove 2223*a* may be formed through the first protruding member 2223*c*. A part of the first insertion member 2223*b* may be inserted into the part of the first sliding groove 2223*a* formed through the first protruding member 2223*c*.

The first catching member 2223*d* may protrude from the first insertion member 2223*b* in the outward direction (direction indicated by arrow OD). As a result, the first catching member 2223*d* may be inserted into the first sliding groove 2223*a* and may be supported by the first protruding member 2223*c*. In the humidifier 1 for fuel cells according to the present disclosure, therefore, it is possible to further increase the force by which the interface between the first divided case 2221 and the second divided case 2222 is prevented from being opened, whereby a gap is prevented from being generated therebetween, using supporting force of the first protruding member 2223*c* that supports the first catching member 2223*d*. The first catching member 2223*d* and the first insertion member 2223*b* may generally be formed in a hook shape. The first catching member 2223*d* and the first insertion member 2223*b* may be integrally formed.

The first press-fit member 2223 may include a first restriction member 2223*e*.

The first restriction member 2223*e* protrudes from the first protruding member 2223*c*. The first restriction member 2223*e* may protrude from the first protruding member 2223*c* in an upward-downward direction (Z-axis direction). The upward-downward direction (Z-axis direction) is a direction perpendicular to each of the first axis direction (X-axis direction) and the second axis direction (Y-axis direction). The first restriction member 2223*e* may protrude from the first protruding member 2223*c* in a direction from the second divided case 2222 to the first divided case 2221. The first restriction member 2223*e* and the first protruding member 2223*c* may be integrally formed.

The first restriction member 2223*e* and the outer surface 2221*a* of the first divided case 2221 may be disposed so as to face each other in the state in which the first sliding groove 2223*a* is located therebetween. In this case, based on the second axis direction (Y-axis direction), the first sliding groove 2223*a* may be disposed between the first restriction member 2223*e* and the first divided case 2221. Consequently, a part of the first insertion member 2223*b* and the first catching member 2223*d* may be inserted into the first sliding groove 2223*a*, whereby the first insertion member 2223*b* and the first catching member 2223*d* may be press-fit between the first restriction member 2223*e* and the outer surface of the first divided case 2221. In the humidifier 1 for fuel cells according to the present disclosure, therefore, it is possible to further increase the force of press-fitting the first insertion member 2223*b* and the first catching member 2223*d* using the first restriction member 2223*e*.

Based on the second axis direction (Y-axis direction), the distance between the first restriction member 2223*e* and the outer surface 2221*a* of the first divided case 2221 may be implemented so as to be less than the sum of the length of the first insertion member 2223*b* and the length of the first catching member 2223*d*. As a result, the first insertion member 2223*b* and the first catching member 2223*d* may be press-fit by the first restriction member 2223*e* and the outer surface 2221*a* of the first divided case 2221 while being inserted into the first sliding groove 2223*a*. In this case, a guide groove 2221*b* (shown in FIG. 6), into which the first insertion member 2223*b* is inserted, may be formed in the part of the outer surface 2221*a* of the first divided case 2221 that contacts the first insertion member 2223*b*. The guide groove 2221*b* may correspond to a part of the first sliding groove 2223*a*.

The first press-fit member 2223 described above may be disposed at each of opposite sides of the inner case 222 based on the second axis direction (Y-axis direction). Consequently, the humidifier 1 for fuel cells according to the present disclosure may be implemented so as to reduce the outflow amount and the inflow amount of the potting liquid through the interface between the first divided case 2221 and the second divided case 2222 at each of the opposite sides of the inner case 222 using the first press-fit member 2223.

Figure 8:
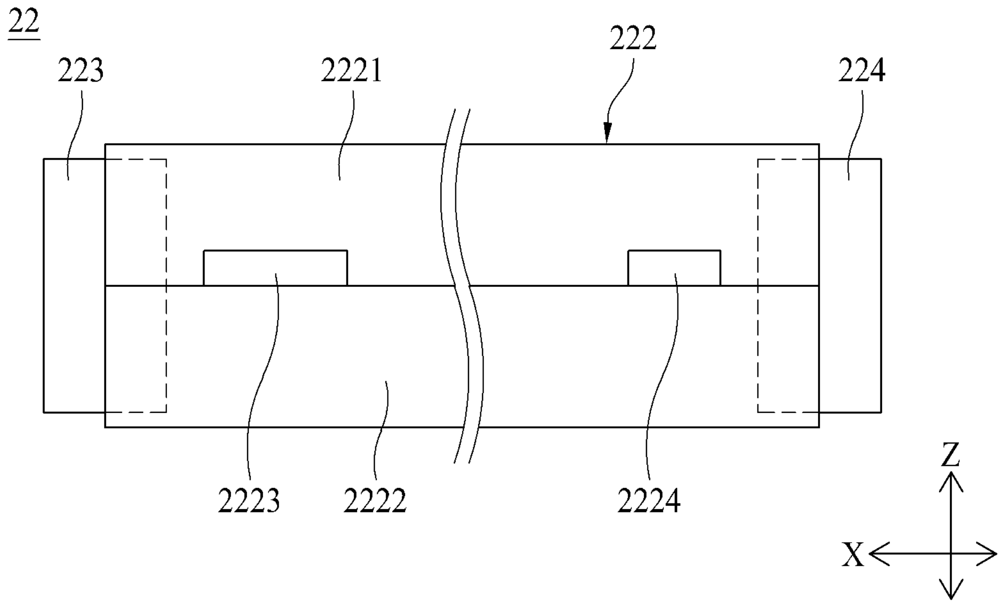
FIG. 8 is a schematic side view of the cartridge of the humidifier for fuel cells according to the present disclosure.

Referring to FIGS. 2 to 8, the inner case 222 may include a second press-fit member 2224 (shown in FIG. 8).

The second press-fit member 2224 is configured to couple the first divided case 2221 and the second divided case 2222 to each other by press-fit. The second press-fit member 2224 may be spaced apart from the first press-fit member 2223 in the first axis direction (X-axis direction). As a result, the second press-fit member 2224 and the first press-fit member 2223 may couple the first divided case 2221 and the second divided case 2222 to each other by press-fit at different positions. In the humidifier 1 for fuel cells according to the present disclosure, therefore, it is possible to more securely couple the first divided case 2221 and the second divided case 2222 to each other, whereby it is possible to further reduce the outflow amount and the inflow amount of the potting liquid through the interface between the first divided case 2221 and the second divided case 2222. In the humidifier 1 for fuel cells according to the present disclosure, therefore, it is possible to further increase the force of fixing the opposite ends of the hollow fiber membranes 221 using the first fixing layer 223 and the second fixing layer 224 and to further improve quality of the cartridge 22 therethrough.

Based on the first axis direction (X-axis direction), the second press-fit member 2224 may be disposed such that the distance from the second fixing layer 224 is shorter than the distance from the first fixing layer 223. That is, the second press-fit member 2224 may be disposed closer to the second fixing layer 224.

The second press-fit member 2224 may be disposed at each of the opposite sides of the inner case 222 based on the second axis direction (Y-axis direction). Consequently, the humidifier 1 for fuel cells according to the present disclosure may be implemented so as to reduce the outflow amount and the inflow amount of the potting liquid through the interface between the first divided case 2221 and the second divided case 2222 at each of the opposite sides of the inner case 222 using the second press-fit member 2224.

The second press-fit member 2224 may include a second sliding groove, a second insertion member, a second protruding member, a second catching member, and a second restriction member. The second sliding groove, the second insertion member, the second protruding member, the second catching member, and the second restriction member may be implemented so as to approximately coincide with the first sliding groove 2223*a*, the first insertion member 2223*b*, the first protruding member 2223*c*, the first catching member 2223*d*, and the first restriction member 2223*e*, respectively, and therefore a detailed description thereof will be omitted.

The second press-fit member 2224 and the first press-fit member 2223 may be formed so as to be different from each other in terms of at least one of shape and size. Consequently, the humidifier 1 for fuel cells according to the present disclosure is implemented so as to be capable of checking an assembly direction of the first divided case 2221 and the second divided case 2222 with the naked eye using the second press-fit member 2224 and the first press-fit member 2223. In this case, the shape of each of the second press-fit member 2224 and the first press-fit member 2223 may mean the contour of each of spaces occupied by the second press-fit member 2224 and the first press-fit member 2223. For example, when the second press-fit member 2224 is formed in the shape of a quadrangular plate, the first press-fit member 2223 may be formed in the shape of a disk. The size of each of the second press-fit member 2224 and the first press-fit member 2223 may be set based on the length of each of the second press-fit member 2224 and the first press-fit member 2223 based on at least one of the first axis direction (X-axis direction), the second axis direction (Y-axis direction), and the upward-downward direction (Z-axis direction). For example, the first press-fit member 2223 may be formed so as to have a larger length than the second press-fit member 2224 based on the first axis direction (X-axis direction), whereby the first press-fit member may be formed so as to have a different length from the second press-fit member 2224.

Referring to FIGS. 2 to 5, 9, and 10, the cartridge 22 may include a gas inlet 225 and a gas outlet 226.

Figure 5:
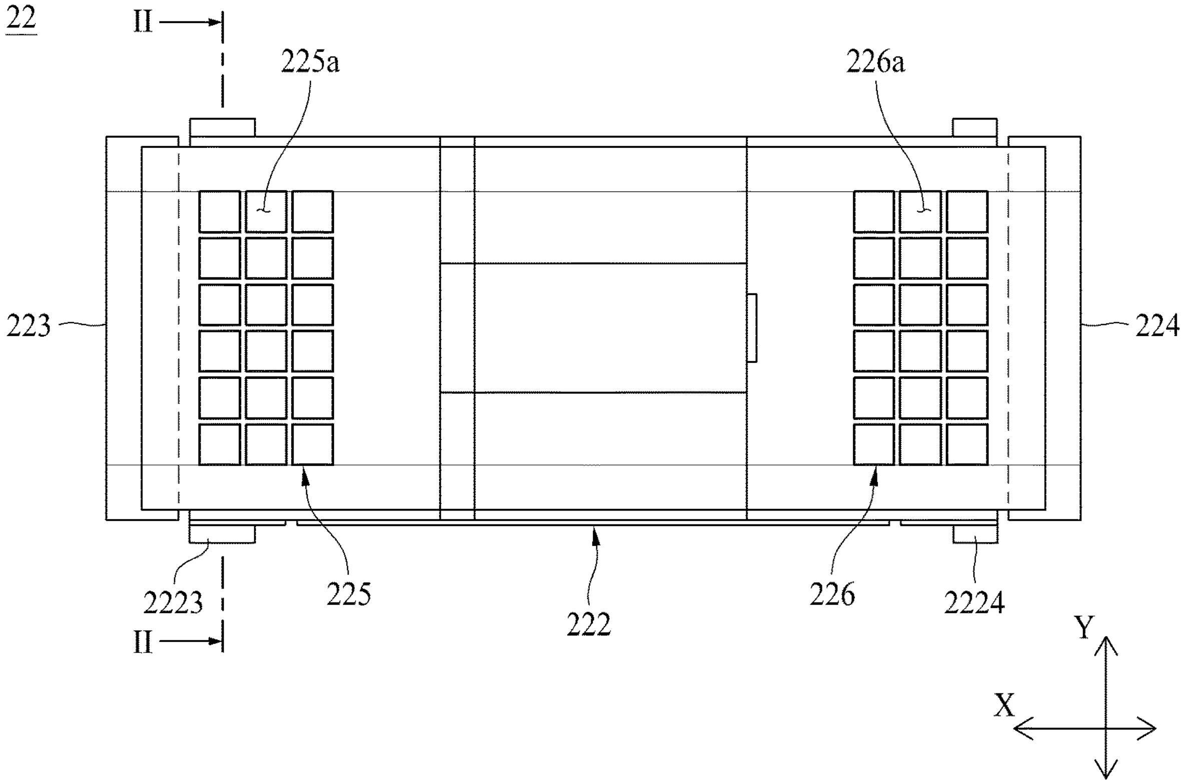
FIG. 5 is a schematic plan view of a cartridge of a humidifier for fuel cells according to the present disclosure.
Figure 6:
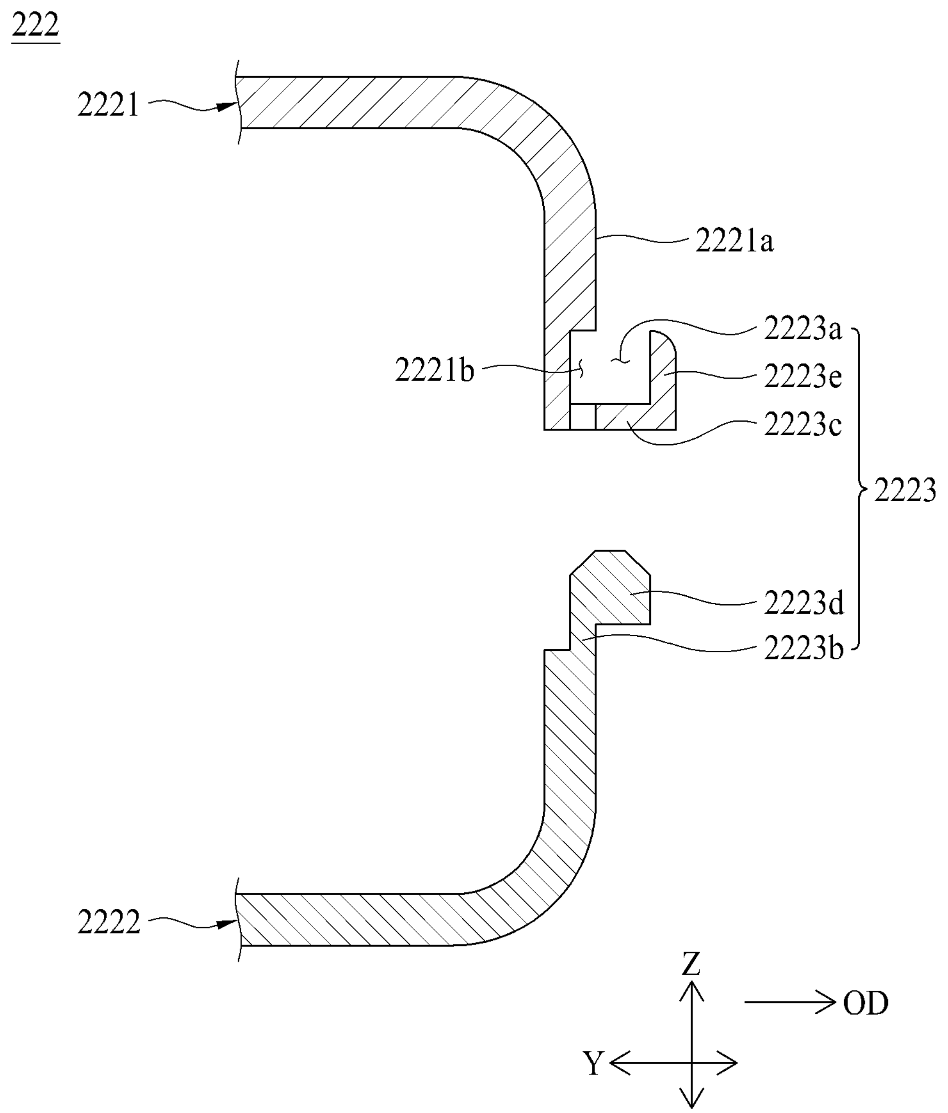
FIG. 6 is a schematic exploded sectional view showing an inner case in the cartridge of the humidifier for fuel cells according to the present disclosure, taken along line II-II of FIG. 5.
Figure 9:
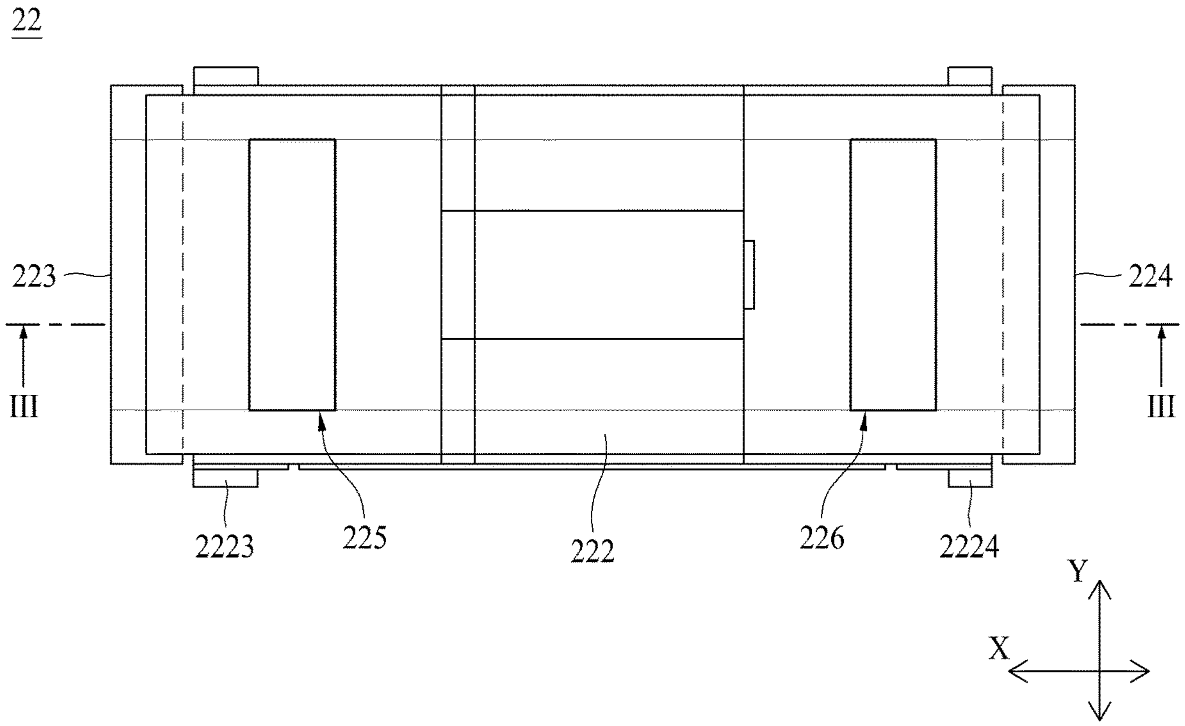
FIG. 9 is a schematic plan view of the cartridge of the humidifier for fuel cells according to the present disclosure.
Figure 10:
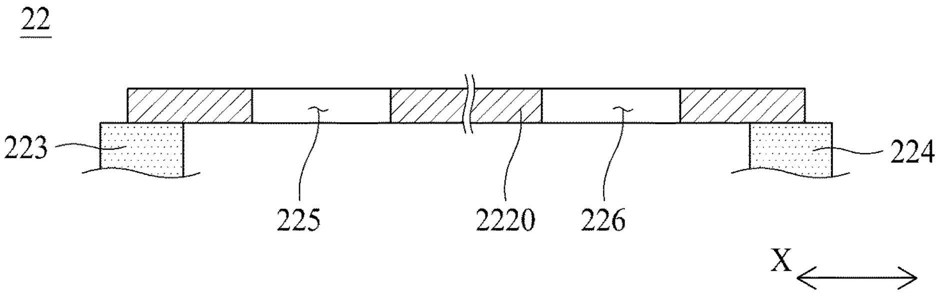
FIG. 10 is a schematic assembled sectional view showing the cartridge of the humidifier for fuel cells according to the present disclosure, taken along line III-III of FIG. 9.

The gas inlet 225 is formed in the inner case 222. The gas inlet 225 may be formed at one side 2220 of the inner case 222. Based on FIG. 10, one side 2220 of the inner case 222 may correspond to an upper surface. The gas inlet 225 may allow wet gas or dry gas to be introduced into the inner case 222 therethrough. The gas inlet 225 may be formed through the inner case 222. As shown in FIGS. 9 and 10, the gas inlet 225 may be implemented by one through-hole formed through the inner case 222. As shown in FIG. 5, the gas inlet 225 may be implemented by a plurality of through-holes formed through the inner case 222. In this case, the gas inlet 225 may include a plurality of inflow windows 225*a* formed through different parts of the inner case 222. The inflow windows 225*a* may be disposed spaced apart from each other in the first axis direction (X-axis direction) and the second axis direction (Y-axis direction) so as to form a matrix. The gas inlet 225 and the first fixing layer 223 may be spaced apart from each other in the first axis direction (X-axis direction). As a result, the gas inlet 225 and the first fixing layer 223 do not overlap each other. Consequently, it is possible to prevent the first fixing layer 223 from being damaged or broken by the pressure of wet gas or dry gas introduced through the gas inlet 225. In each of FIGS. 5 and 9, a dotted line indicates the position of one surface of the first fixing layer 223 that faces the gas inlet 225.

The gas outlet 226 is formed in the inner case 222. The gas outlet 226 may be formed at one side 2220 of the inner case 222. The gas outlet 226 may allow wet gas or dry gas to be discharged from the inner case 222 therethrough. The gas outlet 226 may be formed through the inner case 222. As shown in FIGS. 9 and 10, the gas outlet 226 may be implemented by one through-hole formed through the inner case 222. As shown in FIG. 5, the gas outlet 226 may be implemented by a plurality of through-holes formed through the inner case 222. In this case, the gas outlet 226 may include a plurality of outflow windows 226*a* formed through different parts of the inner case 222. The outflow windows 226*a* may be disposed spaced apart from each other in the first axis direction (X-axis direction) and the second axis direction (Y-axis direction) so as to form a matrix. The gas outlet 226 and the second fixing layer 224 may be spaced apart from each other in the first axis direction (X-axis direction). As a result, the gas outlet 226 and the second fixing layer 224 do not overlap each other. Consequently, it is possible to prevent the second fixing layer 224 from being damaged or broken by the pressure of wet gas or dry gas discharged through the gas outlet 226. In each of FIGS. 5 and 9, a dotted line indicates the position of one surface of the second fixing layer 224 that faces the gas outlet 226. The gas outlet 226 and the gas inlet 225 may be located between the second fixing layer 224 and the first fixing layer 223 based on the first axis direction (X-axis direction) The gas outlet 226 and the gas inlet 225 may be disposed spaced apart from each other in the first axis direction (X-axis direction).

When wet gas flows through the gas outlet 226 and the gas inlet 225, the wet gas may be supplied to a space between an inner surface of the mid-case 21 and an outer surface of the inner case 222 through the inlet 212, may be supplied into the inner case 222 through the gas inlet 225, and may come into contact with the outer surfaces of the hollow fiber membranes 221. During this process, moisture contained in the wet gas may be transmitted through the hollow fiber membranes 221 to humidify dry gas flowing along the hollows of the hollow fiber membranes 221. The humidified dry gas may be discharged from the hollow fiber membranes 221, and may then be supplied to the fuel cell stack through the second cap 4. After humidifying the dry gas, the wet gas may be discharged to the space between the outer surface of the inner case 222 and the inner surface of the mid-case 21 through the gas outlet 226, and may be discharged from the mid-case 21 through the outlet 213.

When dry gas flows through the gas outlet 226 and the gas inlet 225, the dry gas may be supplied to the space between the inner surface of the mid-case 21 and the outer surface of the inner case 222 through the inlet 212, may be supplied into the inner case 222 through the gas inlet 225, and may come into contact with the outer surface of the hollow fiber membrane bundle 22. During this process, moisture in wet gas flowing along the hollows of the hollow fiber membranes 221 may be transmitted through the hollow fiber membranes 221 to humidify the dry gas introduced into the inner case 222. The humidified dry gas may be discharged to the space between the outer surface of the inner case 222 and the inner surface of the mid-case 21 through the gas outlet 226, may be discharged from the mid-case 21 through the outlet 213, and may be supplied to the fuel cell stack. After humidifying the dry gas, the wet gas may be discharged from the hollow fiber membranes 221, and may then be discharged to the outside through the second cap 4.

The present disclosure described above is not limited to the above embodiments and the accompanying drawings, and it will be obvious to a person having ordinary skill in the art to which the present disclosure pertains that various substitutions, modifications, and alterations are possible without departing from the technical idea of the present disclosure.

The invention claimed is:

1. A humidifier for fuel cells, the humidifier comprising:

a humidifying module configured to humidify dry gas supplied from outside using wet gas discharged from a fuel cell stack;

a first cap coupled to one end of the humidifying module; and a second cap coupled to the other end of the humidifying module, wherein the humidifying module comprises:

a mid-case open at opposite ends thereof; and at least one cartridge disposed in the mid-case, the cartridge comprising a plurality of hollow fiber membranes, the cartridge comprises:

an inner case having openings formed in ends thereof, the inner case being configured to receive the hollow fiber membranes; and a first fixing layer and a second fixing layer configured to fix opposite ends of the hollow fiber membranes, and the inner case comprises:

a first divided case and a second divided case configured to receive the hollow fiber membranes; and a first press-fit member configured to couple the first divided case and the second divided case to each other by press-fit, wherein the first fixing layer and the second fixing layer are spaced apart from each other in a first axis direction, the inner case comprises a second press-fit member spaced apart from the first press-fit member in the first axis direction, and the first divided case and the second divided case are coupled to each other by press-fit using the first press-fit member and the second press-fit member, wherein the first press-fit member and the second press-fit member are formed so as to be different from each other in terms of at least one of shape and size.

2. The humidifier according to claim 1, wherein the first press-fit member comprises a first sliding groove formed in the first divided case and a first insertion member formed on the second divided case, and at least a part of the first insertion member is formed so as to have a larger size than the first sliding groove, whereby the at least a part of the first insertion member is press-fit while being inserted into the first sliding groove.

3. The humidifier according to claim 2, wherein the first press-fit member comprises a first protruding member protruding from an outer surface of the first divided case in an outward direction and a first catching member protruding from the first insertion member in the outward direction, the first sliding groove is formed in the first protruding member, and the first catching member is inserted into the first sliding groove and is supported by the first protruding member.

4. The humidifier according to claim 3, wherein the first press-fit member comprises a first restriction member protruding from the first protruding member in an upward-downward direction perpendicular to the outward direction, the outer surface of the first divided case and the first restriction member are disposed so as to face each other in a state in which the first sliding groove is located therebetween, and a part of the first insertion member and the first catching member are press-fit between the outer surface of the first divided case and the first restriction member.

5. The humidifier according to claim 1, wherein the first press-fit member is formed so as to have a larger length than the second press-fit member based on the first axis direction.

6. A cartridge of a humidifier for fuel cells configured to humidify dry gas supplied from outside using wet gas discharged from a fuel cell stack, the cartridge comprising:

an inner case having openings formed in ends thereof, the inner case being configured to receive a plurality of hollow fiber membranes; and a first fixing layer and a second fixing layer configured to fix opposite ends of the hollow fiber membranes, wherein the inner case comprises:

a first divided case and a second divided case configured to receive the hollow fiber membranes; and a first press-fit member configured to couple the first divided case and the second divided case to each other by press-fit, wherein the first fixing layer and the second fixing layer are spaced apart from each other in a first axis direction, the inner case comprises a second press-fit member spaced apart from the first press-fit member in the first axis direction, and the first divided case and the second divided case are coupled to each other by press-fit using the first press-fit member and the second press-fit member, wherein the first press-fit member and the second press-fit member are formed so as to be different from each other in terms of at least one of shape and size.

7. The cartridge according to claim 6, wherein the first press-fit member comprises a first sliding groove formed in the first divided case and a first insertion member formed on the second divided case, and at least a part of the first insertion member is formed so as to have a larger size than the first sliding groove, whereby the at least a part of the first insertion member is press-fit while being inserted into the first sliding groove.

8. The cartridge according to claim 7, wherein the first press-fit member comprises a first protruding member protruding from an outer surface of the first divided case in an outward direction and a first catching member protruding from the first insertion member in the outward direction, the first sliding groove is formed in the first protruding member, and the first catching member is inserted into the first sliding groove and is supported by the first protruding member.

9. The cartridge according to claim 8, wherein the first press-fit member comprises a first restriction member protruding from the first protruding member in an upward-downward direction perpendicular to the outward direction, the outer surface of the first divided case and the first restriction member are disposed so as to face each other in a state in which the first sliding groove is located therebetween, and a part of the first insertion member and the first catching member are press-fit between the outer surface of the first divided case and the first restriction member.

10. The cartridge according to claim 6, wherein the first press-fit member is formed so as to have a larger length than the second press-fit member based on the first axis direction.

* * * * *